US012609768B2

(12) United States Patent
Masuda

(10) Patent No.: US 12,609,768 B2
(45) Date of Patent: Apr. 21, 2026

(54) OPTICAL PATH IDENTIFICATION DEVICE, OPTICAL PATH IDENTIFICATION METHOD, AND STORAGE MEDIUM FOR OPTICAL PATH IDENTIFICATION PROGRAM

(71) Applicant: NEC Corporation, Tokyo (JP)

(72) Inventor: Akira Masuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 348 days.

(21) Appl. No.: 18/271,794

(22) PCT Filed: Jan. 13, 2022

(86) PCT No.: PCT/JP2022/000850
§ 371 (c)(1),
(2) Date: Jul. 11, 2023

(87) PCT Pub. No.: WO2022/154038
PCT Pub. Date: Jul. 21, 2022

(65) Prior Publication Data
US 2024/0063899 A1      Feb. 22, 2024

(30) Foreign Application Priority Data

Jan. 18, 2021      (JP) ................................. 2021-005430

(51) Int. Cl.
*H04B 10/07*          (2013.01)
*H04B 10/071*        (2013.01)
(Continued)

(52) U.S. Cl.
CPC ....... *H04B 10/071* (2013.01); *G01D 5/35361* (2013.01); *G01M 11/3109* (2013.01); *H04B 10/07* (2013.01); *H04B 10/077* (2013.01)

(58) Field of Classification Search
CPC .... H04B 10/071; H04B 10/077; H04B 10/07; G01D 5/35361; G01M 11/3109
(Continued)

(56) References Cited

U.S. PATENT DOCUMENTS 5,506,674 A * 4/1996 Inoue ..................... G02B 6/447
356/73.1
6,269,204 B1 * 7/2001 Ishikawa ............. H04J 14/0282
385/24
(Continued)

FOREIGN PATENT DOCUMENTS

JP       H04-084727 A      3/1992
JP       H05-256730 A      10/1993
(Continued)

OTHER PUBLICATIONS

JP Office Action for JP Application No. 2022-575624, mailed on Sep. 24, 2024 with English Translation.
(Continued)

*Primary Examiner* — Dibson J Sanchez
(74) *Attorney, Agent, or Firm* — Sughrue Mion, PLLC

(57)          ABSTRACT

In order to provide an optical path identification device and the like whereby it is possible to identify a switched optical path without incorporating a transceiver mechanism into an optical path switching device, this optical path identification device is provided with: an optical path identification unit that identifies whether a connected optical path connected to a first optical path is any of a plurality of optical paths from return light information regarding inspection light transmitted to the first optical path and representing the change in intensity over time of return light from the connected optical path; and an output unit for outputting the identification result.

10 Claims, 10 Drawing Sheets

OPTICAL PATH IDENTIFICATION DEVICE 10

(51) Int. Cl.
| | |
|---|---|
| *G01D 5/353* | (2006.01) |
| *G01M 11/00* | (2006.01) |
| *H04B 10/077* | (2013.01) |

(58) Field of Classification Search
USPC ...................................................... 398/9–38
See application file for complete search history.

(56) References Cited

U.S. PATENT DOCUMENTS

| | | | | |
|---|---|---|---|---|
| 2005/0219512 | A1* | 10/2005 | Froggatt | ............ G01M 11/3172 |
| | | | | 356/73.1 |
| 2007/0025676 | A1* | 2/2007 | Russell | ............. G01M 11/3136 |
| | | | | 385/100 |
| 2009/0268197 | A1* | 10/2009 | Perron | ............... G01M 11/3136 |
| | | | | 356/73.1 |
| 2011/0153544 | A1* | 6/2011 | Nagel | ................... H04B 10/071 |
| | | | | 706/54 |
| 2012/0263458 | A1* | 10/2012 | Wen | ..................... H04B 10/071 |
| | | | | 398/28 |
| 2013/0051791 | A1* | 2/2013 | Zhao | ................... H04J 14/0282 |
| | | | | 398/17 |
| 2014/0212131 | A1* | 7/2014 | Zhang | ................. H04B 10/071 |
| | | | | 398/16 |
| 2016/0173194 | A1* | 6/2016 | Zhou | .................... H04B 10/071 |
| | | | | 398/21 |
| 2016/0241330 | A1* | 8/2016 | Sanchez Yanguela | ........................ |
| | | | | H04B 10/071 |
| 2019/0280767 | A1* | 9/2019 | Haber | ................ H04B 10/2537 |
| 2019/0316987 | A1* | 10/2019 | Eddy | ...................... G01M 11/30 |
| 2021/0123817 | A1* | 4/2021 | Champavere | ...... G01D 5/35358 |
| 2021/0404909 | A1* | 12/2021 | Leclerc | ............. G01M 11/3109 |
| 2022/0182138 | A1* | 6/2022 | Bissessur | ............. H04B 10/298 |

FOREIGN PATENT DOCUMENTS

| | | | |
|---|---|---|---|
| JP | H07-087020 | A | 3/1995 |
| JP | H10-229366 | A | 8/1998 |
| JP | 2001-021445 | A | 1/2001 |
| JP | 2003-198465 | A | 7/2003 |
| JP | 2006-135652 | A | 5/2006 |
| JP | 2007-060665 | A | 3/2007 |
| JP | 2008-116277 | A | 5/2008 |

OTHER PUBLICATIONS

International Search Report for PCT Application No. PCT/JP2022/000850, mailed on Mar. 29, 2022.
English translation of Written opinion for PCT Application No. PCT/JP2022/000850, mailed on Mar. 29, 2022.

* cited by examiner

OPTICAL PATH IDENTIFICATION DEVICE 10x

OPTICAL PATH IDENTIFICATION UNIT 16x

OUTPUT UNIT 17x

1

OPTICAL PATH IDENTIFICATION DEVICE, OPTICAL PATH IDENTIFICATION METHOD, AND STORAGE MEDIUM FOR OPTICAL PATH IDENTIFICATION PROGRAM

This application is a National Stage Entry of PCT/JP2022/000850 filed on Jan. 13, 2022, which claims priority from Japanese Patent Application 2021-005430 filed on Jan. 18, 2021, the contents of all of which are incorporated herein by reference, in their entirety.

TECHNICAL FIELD

The present invention relates to an optical path identification device, an optical path identification method, and a storage medium for an optical path identification program that identify a switched optical path.

BACKGROUND ART

In an optical cable system that performs optical communication between land stations by using an optical cable, an optical path switching device that switches an optical path may be installed in an optical cable. In that case, identification of an optical path switched by the optical path switching device is needed in a land station. Identification of a switched optical path is generally performed by transmitting a command signal from the land station to the optical path switching device, and receiving, from the optical path switching device, a response signal including an optical path switching situation to the command signal.

Herein, PTL 1 discloses a method of detecting an optical time domain reflectometry (OTDR) test signal being transmitted on a first optical path, reflected, and coupled to a second optical path, and acquiring OTDR data.

Further, PTL 2 discloses a network management device including a plurality of communication paths that connect between a plurality of pieces of equipment, having a function of automatically changing the plurality of communication paths, and being provided with a processing unit that detects an abnormality in the plurality of communication paths.

CITATION LIST

Patent Literature

PTL 1: Japanese Unexamined Patent Application Publication No. 2007-060665
PTL 2: Japanese Unexamined Patent Application Publication No. 2006-135652

SUMMARY OF INVENTION

Technical Problem

Particularly in an optical submarine cable system, an optical path switching device is installed on a sea bottom, and repair and replacement are not easy, and thus reliability of the optical path switching device needs to be increased. Thus, it may be difficult to incorporate a configuration having a higher occurrence probability of a failure than that of another mechanism, such as a configuration of receiving a command signal and transmitting a response signal.

An object of the present invention is to provide an optical path identification device and the like that are able to identify a switched optical path without incorporating a transmission/reception mechanism into an optical path switching device.

Solution to Problem

An optical path identification device according to the present invention includes: an optical path identification unit that identifies, from return light information being information indicating a time change in intensity of return light from a connected optical path being an optical path connected to a first optical path for an inspection light being transmitted to the first optical path, which of a plurality of optical paths is the connected optical path; and an output unit that outputs a result of the identification.

An optical path identification method according to the present invention includes a procedure of: identifying, from return light information being information indicating a time change in intensity of return light from a connected optical path being an optical path connected to a first optical path for an inspection light being transmitted to the first optical path, which of a plurality of optical paths is the connected optical path; and outputting a result of the identification.

A storage medium for an optical path identification program according to the present invention stores an optical path identification program causing a computer to execute: processing of identifying, from return light information being information indicating a time change in intensity of return light from a connected optical path being an optical path connected to a first optical path for an inspection light being transmitted to the first optical path, which of a plurality of optical paths is the connected optical path; and processing of outputting a result of the identification.

Advantageous Effects of Invention

An optical path identification device and the like according to the present invention are able to identify a switched optical path without incorporating a transmission/reception mechanism into an optical path switching device.

EXAMPLE EMBODIMENT

First Example Embodiment

The present example embodiment is an example embodiment related to an optical path identification device that identifies an optical path switched by an optical path switching device by a time change in intensity of return light by Rayleigh scattering with respect to a probe light being transmitted to an optical fiber included in an optical cable. [Configuration and Operation]

Figure 1:
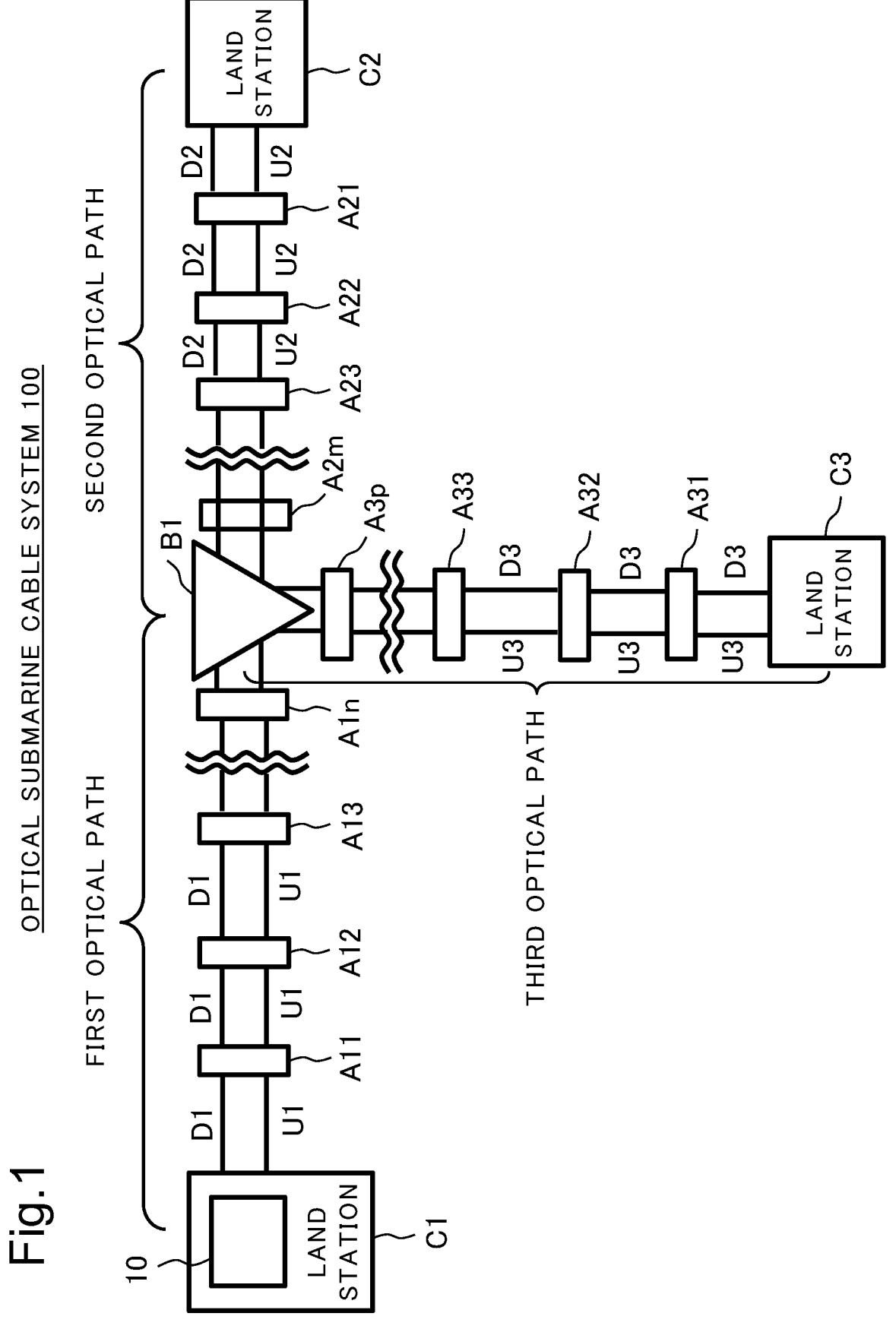
FIG. 1 is a schematic diagram illustrating a configuration example of an optical submarine cable system according to an example embodiment.
Figure 2:
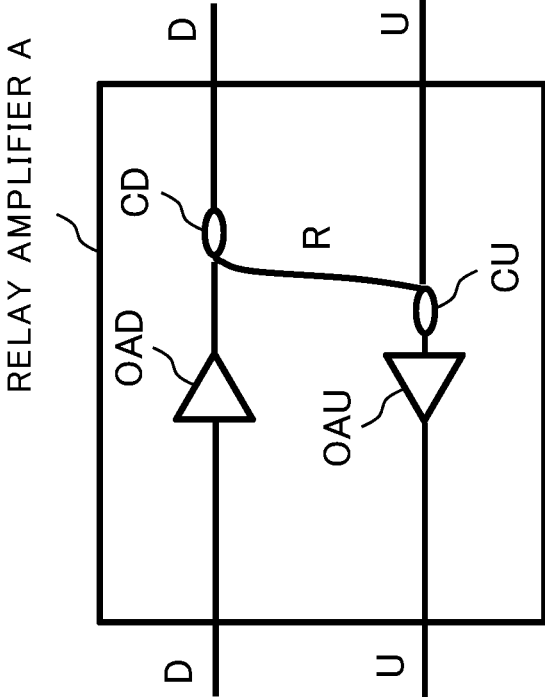
FIG. 2 is a schematic diagram illustrating a configuration example of each relay amplifier according to a first example embodiment.
Figure 3:
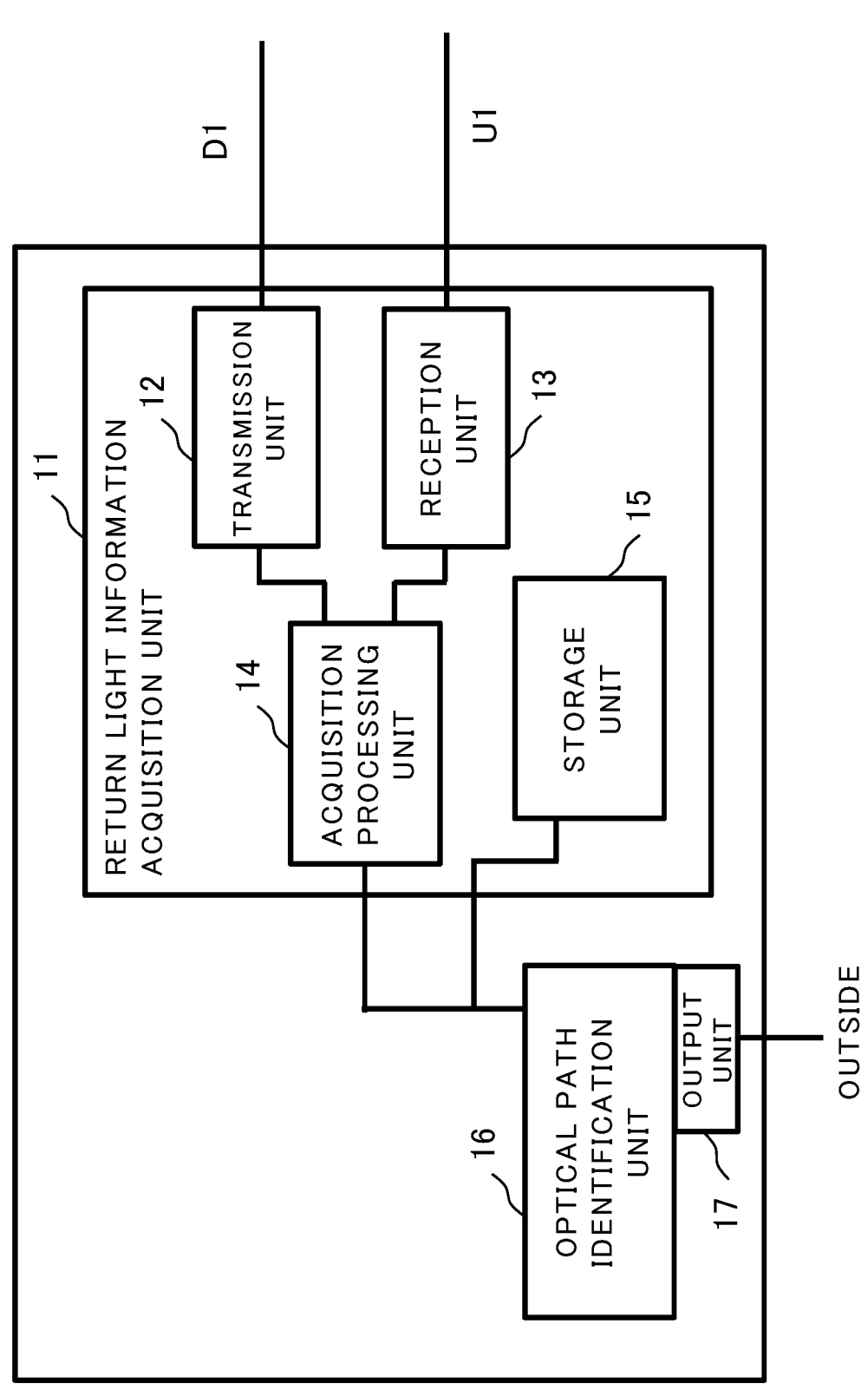
FIG. 3 is a schematic diagram illustrating a configuration example of an optical path identification device according to the first example embodiment.

FIG. 1 is a schematic diagram illustrating a configuration of an optical submarine cable system 100 being an example of an optical submarine cable system according to the present example embodiment. Further, FIG. 2 is a schematic diagram illustrating a configuration of a relay amplifier A being an example of each relay amplifier in FIG. 1. Further, FIG. 3 is a schematic diagram illustrating a configuration example of an optical path identification device 10 in FIG. 1.

The optical submarine cable system 100 is a system for performing optical communication between a land station C1 and a land station C2 or C3. The optical submarine cable system 100 includes the land stations C1 to C3, optical fibers D1 to D3 and U1 to U3, and an optical path switching device B1. The optical submarine cable system 100 further includes relay amplifiers A11 to 1*n* (n relay amplifiers), A21 to A2*m* (m relay amplifiers), and A31 to A3*p* (p relay amplifiers).

The optical fibers D1 and U1 are optical fibers included in an optical submarine cable installed between the land station C1 and the optical path switching device B1. A communication optical signal from the land station C1 to the optical path switching device B1 is transmitted to the optical fiber D1. A communication optical signal from the optical path switching device B1 to the land station C1 is transmitted to the optical fiber U1.

The optical fibers D2 and U2 are optical fibers included in an optical submarine cable installed between the land station C2 and the optical path switching device B1. A communication optical signal from the optical path switching device B1 to the land station C1 is transmitted to the optical fiber D2. A communication optical signal from the land station C2 to the optical path switching device B1 is transmitted to the optical fiber U2.

The optical fibers D3 and U3 are optical fibers included in an optical submarine cable installed between the land station C3 and the optical path switching device B1. A communication optical signal from the optical path switching device B1 to the land station C3 is transmitted to the optical fiber D3. A communication optical signal from the land station C3 to the optical path switching device B1 is transmitted to the optical fiber U3.

The other side with which the land station C1 performs optical communication can be switched between the land station C2 and the land station C3 by the optical path switching device B1. The optical path switching device B1 performs the switching by a configuration including an optical switch, for example.

The relay amplifier A in FIG. 2 is each of the relay amplifiers A11 to 1*n*, A21 to A2*m*, and A31 to A3*p*. The relay amplifier A includes optical amplifiers OAD and OAU, optical couplers CD and CU, and an optical fiber R. Optical fibers D and U in FIG. 2 are any of the optical fibers D1 and U1, D2 and U2, and D3 and U3 in FIG. 1 when the relay amplifier A is any of the relay amplifiers A11 to 1*n*, A21 to A2*m*, and A31 to A3*p*.

In the relay amplifier A, light traveling to the right through the optical fiber D is amplified by the optical amplifier OAD and further travels to the right. The light is subjected to Rayleigh scattering by a portion of the optical fiber D to the right of the optical amplifier OAD. Rayleigh scattered light travels as return light from each scattered place to the left. A time at which the return light traveling to the left through the optical fiber D is incident on the relay amplifier A is later with a longer optical fiber distance from the optical fiber D in which the return light is scattered to the relay amplifier A. Herein, the optical fiber distance is a length along the optical fiber.

A part of the return light incident on the relay amplifier A from the right is separated by the optical coupler CD, travels through the optical fiber R, is incident on the optical fiber U by the optical coupler CU, and travels to the left. Remaining return light not being separated by the optical coupler CD is incident on the optical amplifier OAD. A direction of the incidence of the remaining return light is an opposite direction to a direction of light amplified by the optical amplifier OAD. Thus, the remaining return light vanishes by the optical amplifier OAD.

Return light incident on the relay amplifier A from the right through the optical fiber D is subjected to Rayleigh scattering in the optical fiber D until one right relay amplifier A of the relay amplifier A. The reason is that the return light from the optical fiber D further to the right of the relay amplifier A is blocked by the optical amplifier OAD of the relay amplifier A.

On the other hand, light incident on the relay amplifier A from the right through the optical fiber U is amplified by the optical amplifier OAU and further travels to the left through the optical fiber U. The light incident on the relay amplifier A from the right through the optical fiber U includes return light from the optical fiber D being incident by the optical coupler CU of the one right relay amplifier A.

The optical path identification device 10 illustrated in FIG. 3 includes a return light information acquisition unit 11 and an optical path identification unit 16. The return light information acquisition unit 11 includes a transmission unit 12, a reception unit 13, an acquisition processing unit 14, and a storage unit 15.

The return light information acquisition unit 11 has, for example, a general configuration for performing optical time domain reflectometry (OTDR). The return light information acquisition unit 11 includes the transmission unit 12, the reception unit 13, the acquisition processing unit 14, and the storage unit 15. The transmission unit 12 transmits a probe light for the OTDR to the optical fiber D1. The reception unit 13 converts, into an electric signal, return light with respect to a probe light being incident through the optical fiber U1, and inputs the electric signal to the acquisition processing unit 14.

The probe light being transmitted from the transmission unit 12 to the optical fiber D1 travels to the right through the optical fiber D1 in FIG. 1. The probe light attenuates at a long distance at which the probe light travels through the optical fiber D1, but each time the probe light passes through each of the relay amplifiers A11 to A1n (the relay amplifier A in FIG. 3), the probe light is amplified by the optical amplifier OAD of the relay amplifier A. Thus, the probe light travels to the right while repeating amplification by the relay amplifier A and attenuation until the probe light travels to the further right relay amplifier A.

Due to the repetition of the amplification and the attenuation of the probe light by traveling to the right through the optical fiber D1, intensity of return light of the probe light by Rayleigh scattering in each position of the optical fiber D1 also repeats an increase and attenuation. Furthermore, an arrival time of the return light in the land station C1 is later by Rayleigh scattering in a position of the optical fiber D1 having a longer optical fiber distance from the land station C1. Thus, intensity of the return light indicated by an electric signal incident on the acquisition processing unit 14 is reflected by repetition with a lapse of time of attenuation of the probe light by traveling through the optical fiber D1 and amplification of the probe light by the relay amplifier A.

Hereinafter, a time change in intensity of return light indicated by an electric signal incident on the acquisition processing unit 14 is referred to as "return light information". The return light information about an optical path (hereinafter referred to as a "first optical path") in a section between the land station C1 and the optical path switching device B1 is unique to a configuration of the first optical path. The configuration includes, for example, an amplification factor of light in each relay amplifier A and a length of an optical submarine cable between two adjacent relay amplifiers A. Alternatively, when another configuration (another optical submarine device) that attenuates intensity of a probe light and is not illustrated is installed in the first optical path, presence of the configuration is also a factor that makes the return light information unique to the first optical path.

Herein, a case where the optical path switching device B1 connects the first optical path to a second optical path (optical path in a section between the optical path switching device B1 and the land station C2) is assumed. In that case, the first optical path and a third optical path (optical path in a section between the optical path switching device B1 and the land station C3) are not connected.

In that case, return light information about the second optical path is acquired by the acquisition processing unit 14 after the return light information about the first optical path. The return light information about the second optical path is unique to a configuration of the second optical path for a reason similar to that of the return light information about the first path.

Further, a case where the optical path switching device B1 connects the first optical path to the third optical path is assumed. In that case, the first optical path and the second optical path are not connected.

In that case, return light information about the third optical path is acquired by the acquisition processing unit 14 after the return light information about the first optical path. The return light information about the third optical path is unique to a configuration of the third optical path for a reason similar to that of the return light information about the first optical path.

Figure 4:
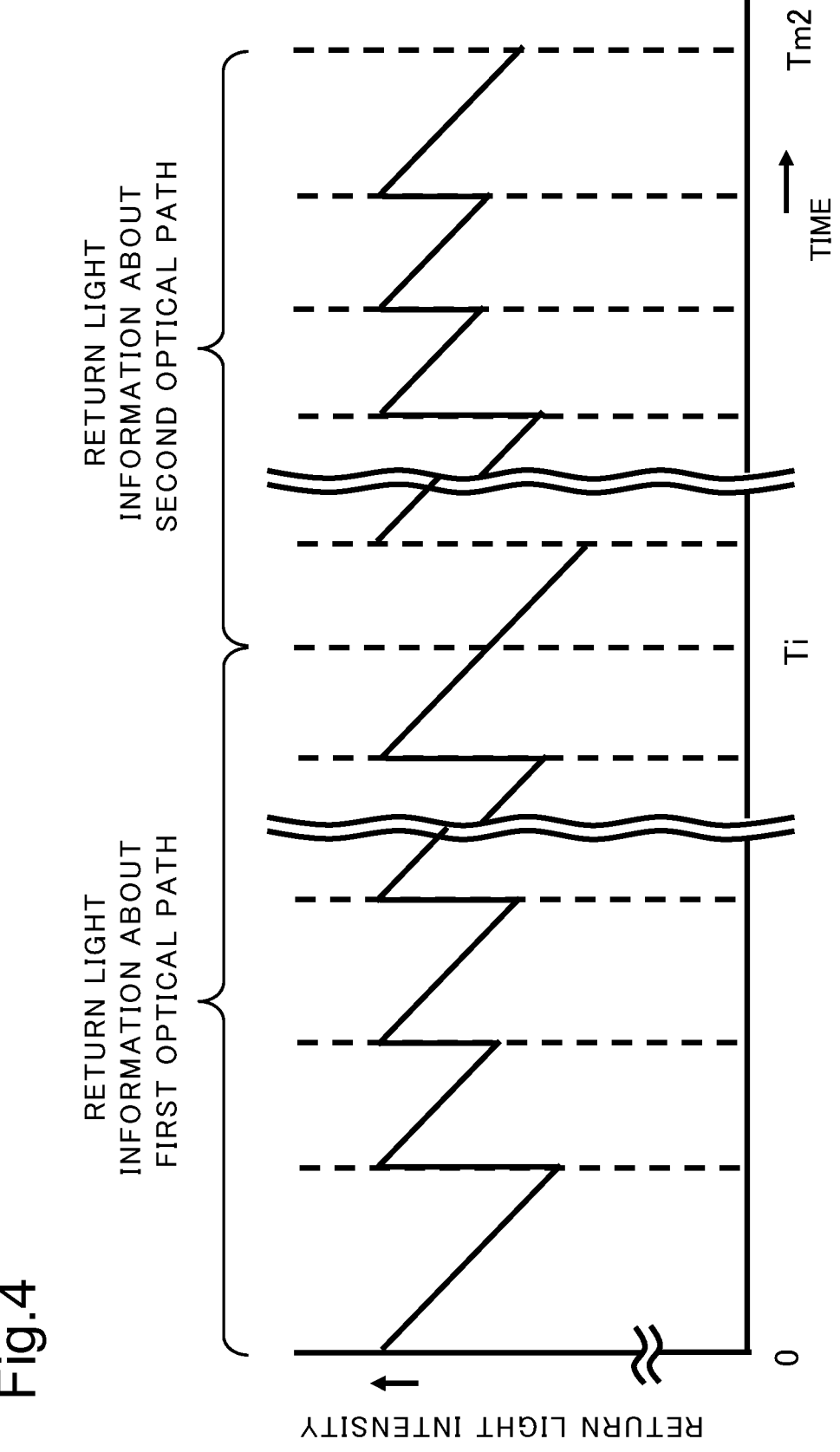
FIG. 4 is an image diagram illustrating an example of return light information according to the first example embodiment when a first optical path is connected to a second optical path.

Herein, description of FIG. 3 is interrupted, and an example of return light information will be described. FIG. 4 is an image diagram illustrating an example of return light information when the optical path switching device B1 connects the first optical path to the second optical path. A time 0 in FIG. 4 is a time at which the transmission unit 12 in FIG. 3 transmits a probe light to the optical fiber D1. Return light information between the time 0 and a time Ti is return light information about the first optical path. Return light information between the time Ti and a time Tm2 is return light information about the second optical path.

The return light information about the first optical path reflects a configuration of the first optical path such as a number n being the number of the relay amplifiers A in this section, an optical cable distance of an optical submarine cable between two adjacent relay amplifiers A, and an amplification factor of each relay amplifier A. Thus, the return light information in this section is unique to the first optical path.

The return light information about the second optical path reflects a configuration of the second optical path such as m being the number of the relay amplifiers A in this section, an optical cable distance of an optical submarine cable between two adjacent relay amplifiers A, and an amplification factor of each relay amplifier A. Thus, the return light information in this section is unique to the second optical path.

Figure 5:
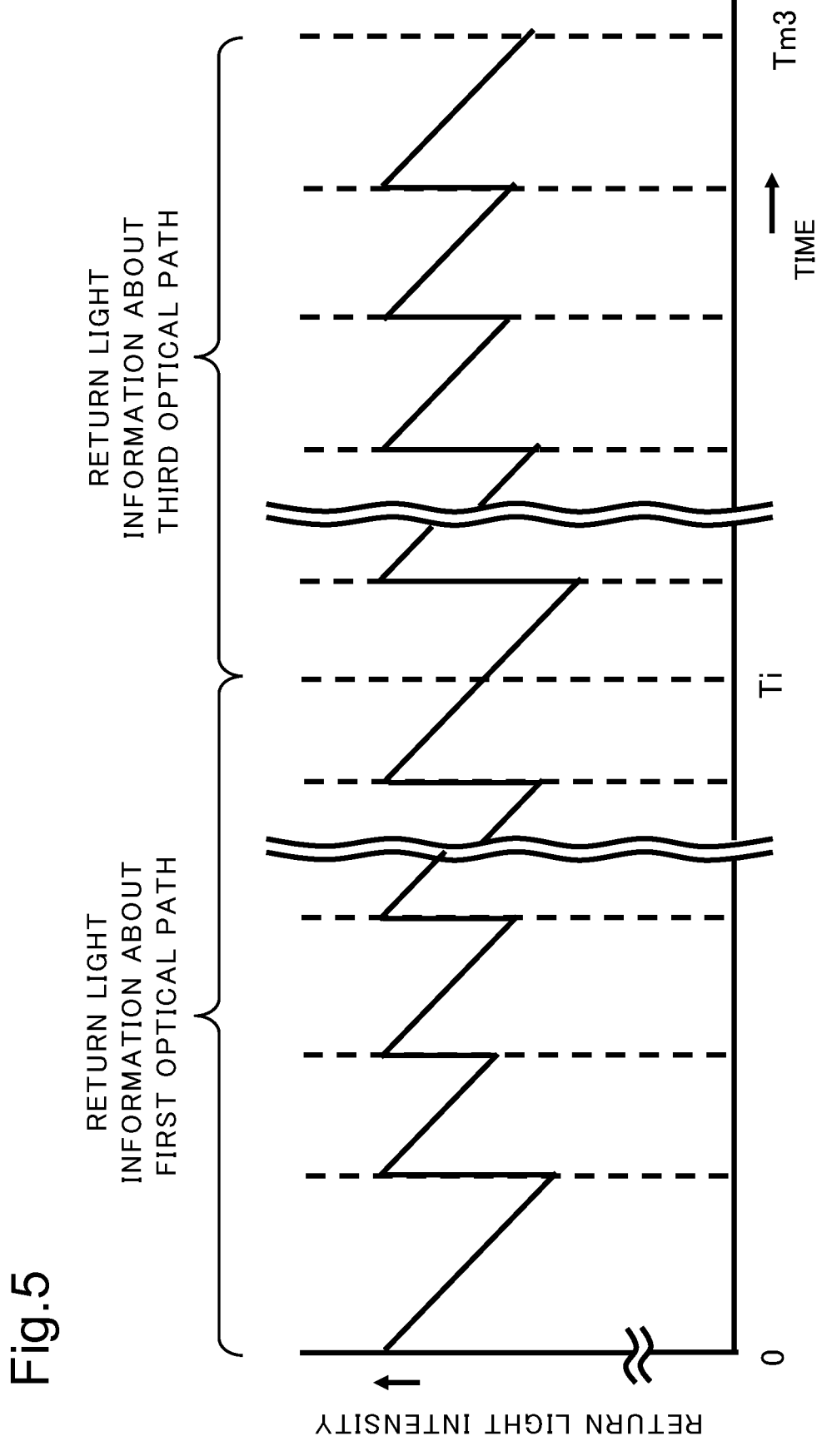
FIG. 5 is an image diagram illustrating an example of return light information according to the first example embodiment when the first optical path is connected to a third optical path.

FIG. 5 is an image diagram illustrating an example of return light information when the optical path switching device B1 connects the first optical path to the third optical path. A time 0 in FIG. 5 is a time at which the transmission unit 12 in FIG. 3 transmits a probe light to the optical fiber D1. Return light information between the time 0 and a time Ti is return light information about the first optical path. Return light information between the time Ti and a time Tm3 is return light information about the third optical path.

The return light information about the first optical path is the same as that illustrated in FIG. 4. The return light information about the third optical path reflects a configuration unique to the third optical path such as a number p being the number of the relay amplifiers A in the third optical path, an optical cable distance of an optical submarine cable between two adjacent relay amplifiers A, and an amplification factor of each relay amplifier A. Thus, the return light information about the third optical path is unique to the third optical path.

Note that, in FIGS. 4 and 5, it is assumed that each relay amplifier A performs amplification in such a way that return light that is attenuated by traveling through an optical fiber and has different intensity is at an equal level. However, each relay amplifier A does not necessarily need to perform such amplification. A pattern of the return light information has a shape according to an amplification factor of each relay amplifier.

Herein, the return light information in FIG. 4 and the return light information in FIG. 5 are compared. In that case, shapes of patterns of the return light information between the time 0 and the time Ti are the same in FIGS. 4 and 5. However, shapes of patterns of the return light information after the time Ti are different in FIGS. 4 and 5. Therefore, by using a difference between the shapes of the patterns of the return light information, whether connection destinations of the optical fibers D1 and U1 in the optical path switching device B1 are the optical fibers D2 and U2 or the optical fibers D3 and U3 can be identified.

The optical path identification unit 16 in FIG. 3 performs the identification by latest return light information being acquired by the acquisition processing unit 14 and stored in the storage unit 15.

In the return light information in FIGS. 4 and 5, all maximums (peaks) of the return light due to the amplification by the relay amplifier A appear. Then, the number m being the number of the relay amplifiers A in the second optical path and the number p being the number of the relay amplifiers A in the third optical path are generally different. In such a case, the optical path identification unit 16 can identify, by a maximum (peak) number of the return light, whether a connection destination of the first optical path in the optical path switching device B1 is either the second optical path or the third optical path. In that case, the optical path identification unit 16 performs the identification by, for example, comparing reference information about m and p being held in advance by the storage unit 15 with the maximum (peak) number of the return light.

However, for example, when the land station C2 is located extremely far from the optical path switching device B1, and the like, a maximum (peak) of the return light of the relay amplifier A far from the optical path switching device B1 may be buried in noise and may not appear in the return light information. In that case, the optical path identification unit 16 may identify connection destinations of the optical fibers D1 and U1 in the optical path switching device B1 by return light intensity at each time and an interval between maximums (peaks) of the return light in the return light information in a range that can be acquired. In that case, the optical path identification unit 16 performs the identification by comparing, with the data in the acquired return light information, reference information about return light intensity of each optical path and an interval between maximums (peaks) of the return light being held in advance by the storage unit 15.

Alternatively, the optical path identification unit 16 may identify a connection destination by a similarity determination with reference information held by the storage unit 15 about return light information itself when a connection destination of the first optical path is each of the second optical path and the third optical path. A general method for determining similarity between pieces of data can be applied to the similarity determination method in that case.

As the reference information described above, for example, data about return light information acquired by actually switching a connection destination of the first optical path by the optical path switching device B1 and being subjected to machine learning by a computer may be used. A method by a similarity determination with reference information about return light information itself can also be applied to a case where an optical path does not include a relay amplification device.

Alternatively, the optical path identification unit 16 may identify a connection destination of the first optical path by a degree of intensity of return light in return light information. The degree of the intensity of the return light in this case is, for example, an average value and a maximum value of the intensity of the return light. In that case, the optical path identification unit 16 performs the identification by comparing a degree of intensity of the return light being held in advance by the storage unit 15 with the degree of the intensity of the return light in the acquired return light information.

A method using a degree of intensity of return light can also be applied to a case where an optical path does not include a relay amplification device.

Alternatively, the optical path identification unit 16 may identify a connection destination of the first optical path by a time (time since a probe light is transmitted) at which the return light arrives from a maximum (peak) of intensity located in a position having a longest optical cable distance in the return light information. In that case, the optical path identification unit 16 performs the identification by comparing, with the data in the acquired return light information, a time (time since a probe light is transmitted) at which the return light arrives from a position having a longest optical cable distance being held in advance by the storage unit 15.

Alternatively, the optical path identification unit 16 may identify a connection destination of the first optical path by combining the methods described above.

As long as return light information can be acquired, an optical path identified by the optical path identification device according to the present example embodiment may include two or more optical path switching devices. Herein, the reason for "as long as return light information can be acquired" is that return light information may not be able to be acquired due to an influence such as noise for an optical path having an extremely long optical cable distance from the optical path identification device. In that case, the optical path identification device identifies an optical path that is included in an optical path in a range in which return light information can be acquired and is switched by the optical path switching device. In an optical path of each optical path switching device being included in the optical path in the range in which the return light information can be acquired, the return light information responds to an optical path switched by each optical path switching device. Thus, the optical path can be identified by the return light information.

Note that the optical path identification unit 16 in FIG. 3 outputs and stores an identification result of a connection destination optical path in the storage unit 15. Further, the optical path identification unit 16 outputs the identification result from the output unit 17 to the outside. The outside is, for example, a display device, a sound output device, a printing device, a transmission device, or the like.

A combination of the acquisition processing unit 14, the storage unit 15, the optical path identification unit 16, and the output unit 17 in FIG. 3 includes a computer or is included in a computer, for example. In that case, the computer performs processing according to an operation described in the example embodiment by a program being held in advance by the storage unit 15.

[Effect]

The optical path identification device according to the present example embodiment acquires return light information being information indicating a time change in intensity of return light by Rayleigh scattering from each position of an optical fiber included in an optical submarine cable with respect to a probe light being transmitted to the optical fiber. The return light information includes return light information from an optical path ahead of the optical path switching device. In that case, the return light information from the optical path ahead of the optical path switching device reflects a configuration of the optical path switching device and is unique to a configuration of the optical path being a switching destination. The optical path identification device according to the present example embodiment identifies a switching destination by the return light information being unique to the configuration of the optical path being the switching destination. Thus, the optical path identification device according to the present example embodiment does not need to acquire information about the optical path being the switching destination by communication with the optical path switching device. Thus, the optical path identification device according to the present example embodiment can identify a switched optical path without incorporating a transmission/reception mechanism into the optical path switching device.

Second Example Embodiment

The optical path identification device according to the first example embodiment identifies, by return light information about return light by Rayleigh scattering, an optical path switched by the optical path switching device. However, the return light by Rayleigh scattering is relatively weak. Thus, when the return light by Rayleigh scattering is used, it may be difficult to acquire the return light information due to an influence of noise and the like for an optical path having a long optical cable distance from the optical path identification device. Thus, in an optical submarine cable system according to the present example embodiment, a return light path different from the return light path according to the first example embodiment is provided in a relay amplifier. The return light path is a type in which a part of a probe light is taken out by a transmission optical fiber and is incident on a reception optical fiber. By the return light path, the amount of return light returning from each relay amplifier is significantly greater than that of return light by Rayleigh scattering. Thus, an optical path identification device in the optical submarine cable system according to the present example embodiment can use return light information for an optical path having a longer optical cable distance than that in the optical path identification device in the optical submarine cable system according to the first example embodiment. Thus, the optical path identification device in the optical submarine cable system according to the present example embodiment can identify an optical path switched by an optical path switching device for an optical path having a longer optical cable distance than that in the optical path identification device in the optical submarine cable system according to the first example embodiment.

[Configuration and Operation]

A configuration example of the optical submarine cable system according to the present example embodiment is the configuration of the optical submarine cable system 100 illustrated in FIG. 1, but a configuration of each relay amplifier is different from the configuration of the relay amplifier according to the first example embodiment. Herein, each relay amplifier is each of the relay amplifiers A11 to A1$n$, A21 to A1$m$, and A31 to A3$p$ in FIG. 1. The configuration example of the optical path identification device 10 in FIG. 1 is the same as that illustrated in FIG. 3.

Figure 6:
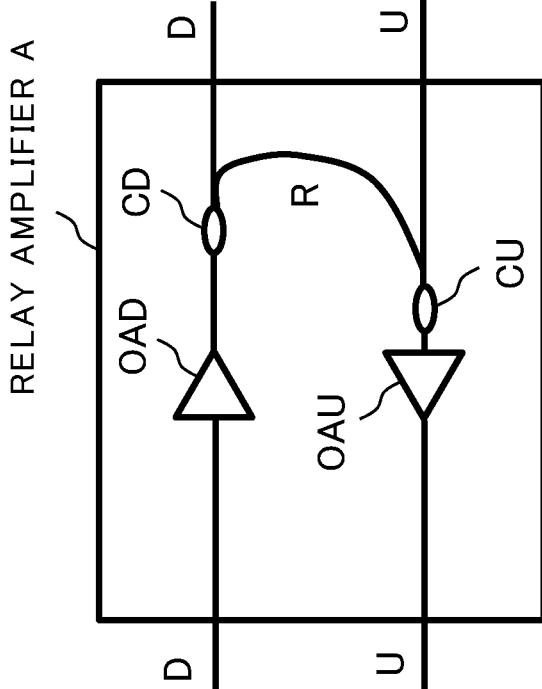
FIG. 6 is a schematic diagram illustrating a first configuration example of each relay amplifier according to a second example embodiment.

FIG. 6 is a schematic diagram illustrating a configuration of a relay amplifier A being a first example of each relay amplifier according to the present example embodiment. The relay amplifier A includes optical amplifiers OAD and OAU, optical couplers CD and CU, and an optical fiber R. Optical fibers D and U are the same as those in FIG. 2.

A probe light having a pulse shape traveling to the right through the optical fiber D is amplified by the optical amplifier OAD. A part of the probe light after the amplification is separated by the optical coupler CD and is incident on the optical fiber R. The separated probe light is incident on the optical fiber U by the optical coupler CU, and travels as return light through the optical fiber U toward the optical path identification device 10. Subsequently, return light by one right relay amplifier A passes through the optical fiber U in a position of this relay amplifier A. A difference between a time at which this relay amplifier A causes the return light to be incident on the optical fiber U, and a passage time of the return light caused by the one right relay amplifier A to be incident on the optical fiber U through the optical fiber U in the position of this relay amplifier A is a value proportional to an optical cable distance. The optical cable distance is an optical cable distance between this relay amplifier A and the one right relay amplifier A.

Each relay amplifier in FIG. 1 performs an operation of the relay amplifier A described above. Thus, return light from each relay amplifier A is incident on the reception unit

13 in FIG. 3 by a time difference according to an optical cable distance between two adjacent relay amplifiers A. Then, a combination of a distance between two adjacent relay amplifiers A is unique to a second optical path and a third optical path. Thus, return light information about the second optical path is different from return light information about the third optical path.

Figure 7:
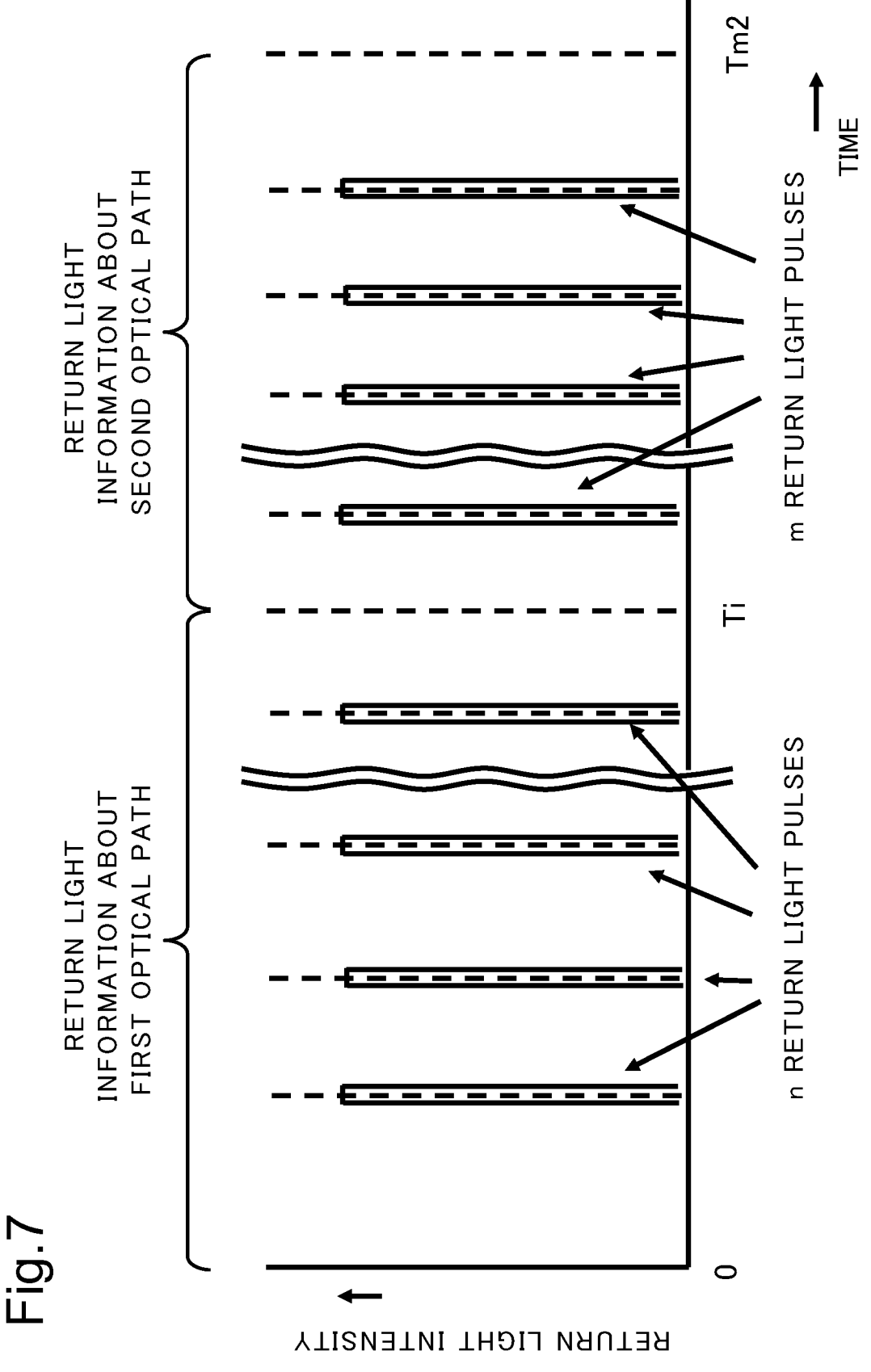
FIG. 7 is an image diagram illustrating return light information according to the second example embodiment when a first optical path is connected to a second optical path.

FIG. 7 is an image diagram illustrating return light information when the optical path switching device B1 in FIG. 1 sets a connection destination of a first optical path as the second optical path. The return light information is acquired by the acquisition processing unit 14 in FIG. 3. The acquisition processing unit 14 acquires return light information about the second path after the return light information about the first optical path.

Figure 8:
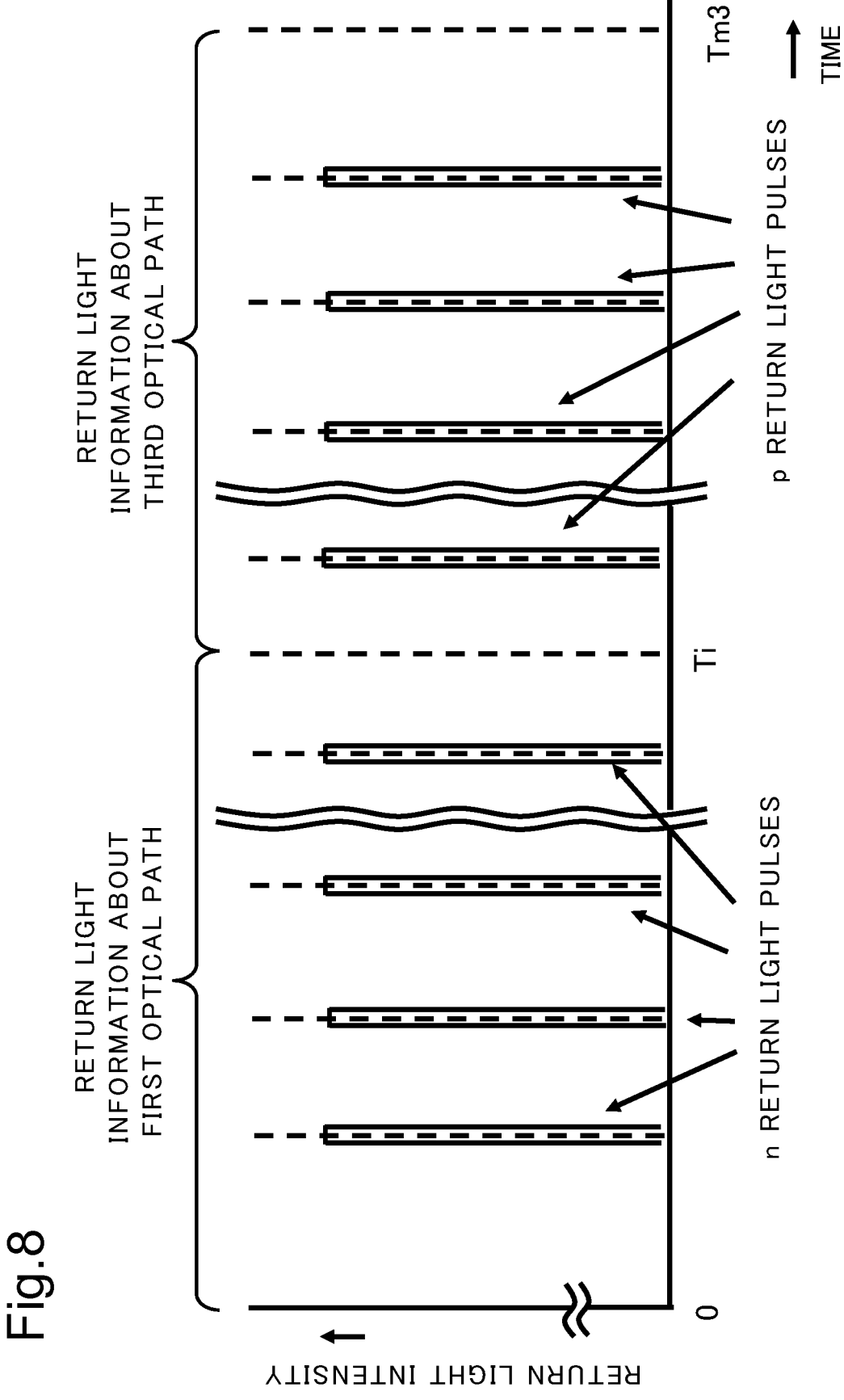
FIG. 8 is an image diagram illustrating return light information according to the second example embodiment when the first optical path is connected to a third optical path.

FIG. 8 is an image diagram illustrating return light information when the optical path switching device B1 in FIG. 1 sets a connection 5 destination of the first optical path as the third optical path. The return light information is acquired by the acquisition processing unit 14 in FIG. 3. The acquisition processing unit 14 acquires return light information about the third optical path after the return light information about the first optical path.

Note that FIGS. 7 and 8 illustrate an example of the return light information when each relay amplifier A performs optical amplification in such a way that intensity of a pulse of return light is equal. However, each relay amplifier A does not necessarily need to perform such optical amplification. Intensity of a pulse of each beam of return light has a value depending on an amplification factor of the optical amplification being performed by each relay amplifier A.

Herein, the return light information is compared between FIG. 7 and FIG. 8. The return light information about the first optical path is the same in FIG. 7 and FIG. 8. In contrast, the return light information about the second optical path in FIG. 7 is different from the return light information about the third optical path in FIG. 8.

First, the number of pulses of return light in the return light information about the second optical path is m, whereas the number of pulses of return light in the return light information about the third optical path is p. When a configuration of each relay amplifier A is the configuration in FIG. 6, one pulse of return light is generated in each relay amplifier A. Thus, the pulse of the return light is the number of the relay amplifiers A included in each optical path. The number of the relay amplifiers A included in each optical path generally varies. In that case, the optical path identification unit 16 in FIG. 3 identifies, from the number of peaks of the return light, whether a connection destination of the first optical path is the second optical path or the third optical path.

Further, a combination of an optical cable distance between two adjacent relay amplifiers A is generally different between the second optical path and the third optical path. In that case, the optical path identification unit 16 identifies, from a difference between the second optical path and the third optical path in combination of an optical cable distance between two adjacent relay amplifiers A, whether a connection destination of the first optical path is the second optical path or the third optical path. This method is effective when a part of return light information cannot be acquired due to an influence such as noise for a distant portion of an optical path.

Alternatively, the optical path identification unit 16 may identify whether a connection destination of the first optical path by the optical path switching device B1 is the second optical path or the third optical path by a similarity determination with reference information held by the storage unit 15 about return light information including the return light information about the second optical path and the third optical path. A general method for determining similarity between two pieces of data can be used as the method of a similarity determination in that case. As the reference information described above, for example, data about return light information acquired by actually switching a connection destination of the first optical path by the optical path switching device B1 and being subjected to machine learning by a computer may be used. The method using a similarity determination is also effective when a part of return light information cannot be acquired due to an influence such as noise for a distant portion of an optical path.

Figure 9:
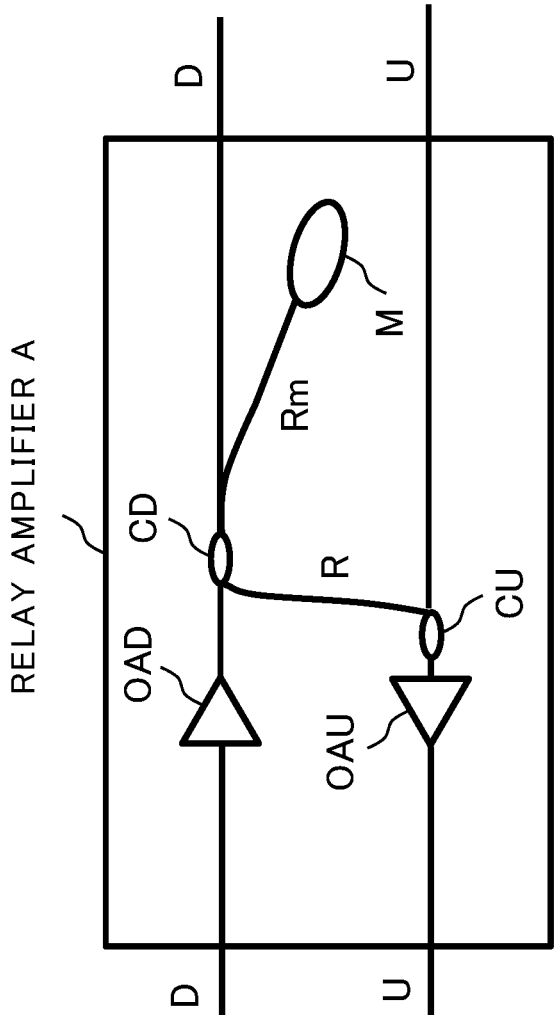
FIG. 9 is a schematic diagram illustrating a second configuration example of a relay amplifier according to the second example embodiment.

FIG. 9 is a schematic diagram illustrating a configuration of the relay amplifier A being a second example of a relay amplifier according to the present example embodiment. The relay amplifier A in FIG. 9 includes optical amplifiers OAD and OAU, optical couplers CD and CU, optical fibers R and Rm, and a reflector M. Optical fibers D and U are the same as those in FIG. 2.

A probe light having a pulse shape traveling to the right through the optical fiber D is amplified by the optical amplifier OAD. A part of the probe light after the amplification is separated by the optical coupler CD and is incident on the reflector M through the optical fiber Rm. Reflected light being reflected by the reflector M is incident on the optical fiber R via the optical fiber Rm and the optical coupler CD. The reflected light being incident on the optical fiber R is incident on the optical fiber U by the optical coupler CU, and travels as return light through the optical fiber U toward the optical path identification device 10. Subsequently, return light by one right relay amplifier A passes through the optical fiber U in a position of this relay amplifier A. A difference between a time at which this relay amplifier A causes the return light to be incident on the optical fiber U, and a passage time of the return light caused by the one right relay amplifier A to be incident on the optical fiber U through the optical fiber U in the position of this relay amplifier A is a value proportional to an optical cable distance. The optical cable distance is an optical cable distance between this relay amplifier A and the one right relay amplifier A.

Also when the relay amplifier A in FIG. 9 is used, the acquisition processing unit 14 in FIG. 3 acquires return light information similar to that when the relay amplifier A in FIG. 6 is used.

The optical path identification unit 16 performs the identification operation described above by return light information similar to that when the relay amplifier A in FIG. 6 is used.

Note that, even when two or more optical path switching devices are provided in an optical path, the optical path identification device according to the second example embodiment can identify an optical path switched by the optical path switching device. The identification can be achieved as long as return light information about an optical path ahead of the optical path switching device can be acquired. Only in that case, an optical path switched by each optical path switching device has return light information being unique according to a configuration of the optical path switched by each optical path switching device. Thus, the optical path identification device can identify the switched optical path from the unique return light information.

Effect

The optical path identification device according to the present example embodiment acquires return light information about return light in each relay amplifier with respect to a probe light being transmitted to an optical fiber included in an optical submarine cable. The return light information includes return light information from an optical path ahead of the optical path switching device. In that case, the return light information from the optical path ahead of the optical path switching device reflects a configuration of the optical path switching device and is unique to a configuration of the optical path being a switching destination. The optical path identification device according to the present example embodiment identifies a switching destination by the return light information being unique to the configuration of the optical path being the switching destination. Thus, the optical path identification device according to the present example embodiment does not need to acquire information about the optical path being the switching destination by communication with the optical path switching device. Thus, the optical path identification device according to the present example embodiment can identify an optical path switched by the optical path without incorporating a transmission/reception mechanism into the optical path switching device.

Furthermore, in the optical submarine cable system according to the present example embodiment, a return light path of a type in which a part of a probe light is taken out by a transmission optical fiber and is incident on a reception optical fiber is provided in the relay amplifier. By the return light path, intensity of return light returning from each relay amplifier is significantly greater than that of return light by Rayleigh scattering. Thus, the optical path identification device in the optical submarine cable system according to the present example embodiment can identify an optical path connected to the optical path switching device for an optical path having a longer optical cable distance than that in the optical path identification device in the optical submarine cable system according to the first example embodiment.

Note that, in the description above, the example in which the acquisition processing unit also acquires the return light information for the first optical path is described. However, the acquisition processing unit does not need to acquire the return light information for the first optical path. Further, when the acquisition processing unit does not acquire the return light information for the first optical path, the relay amplifier in the first optical path does not need to include a return light path.

Further, an optical cable does not necessarily need to be an optical submarine cable, and may be an optical cable installed on land.

Figure 10:
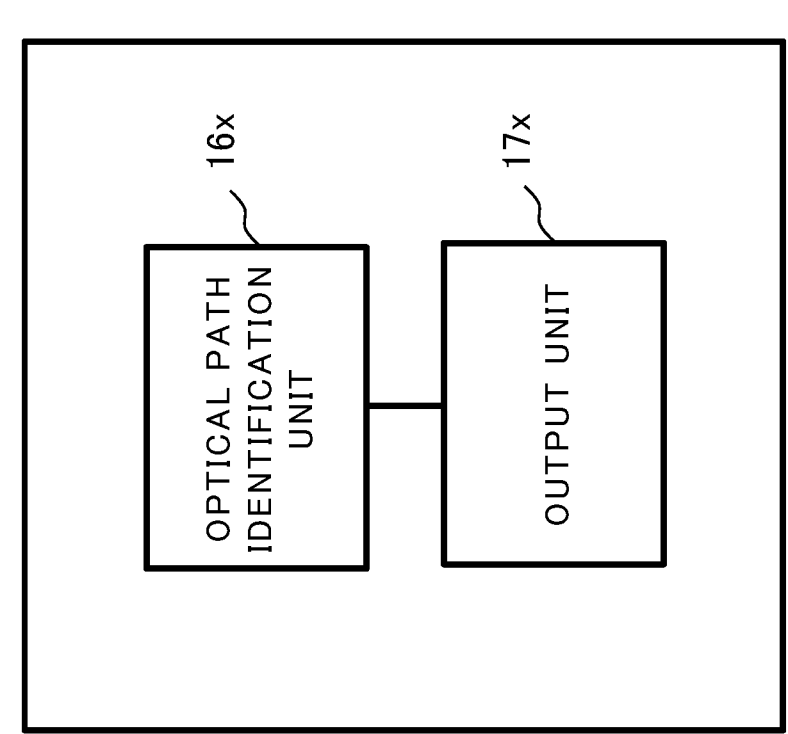
FIG. 10 is a schematic diagram illustrating a minimum configuration of an optical path identification device according to an example embodiment.

FIG. 10 is a block diagram illustrating a configuration of an optical path identification device 10x being an optical path identification device according to an example embodiment. The optical path identification device 10x includes an optical path identification unit 16x and an output unit 17x. The optical path identification unit 16x identifies, from return light information being information indicating a time change in intensity of return light from a connected optical path being an optical path connected to a first optical path for an inspection light being transmitted to the first optical path, which of a plurality of optical paths is the connected optical path. The output unit 17x outputs a result of the identification.

The optical path identification device 10x identifies and outputs which of a plurality of optical paths is the connected optical path from the return light information. Thus, the optical path identification device 10x can identify a switched optical path without incorporating a transmission/reception mechanism into the optical path switching device. Thus, the optical path identification device 10*x* with the above-described configuration achieves the effect described in the section of

Advantageous Effects of Invention

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

A part or the whole of the above-mentioned example embodiments may also be described in supplementary notes below, which is not limited thereto.

Supplementary Note 1

An optical path identification device including:
an optical path identification unit that identifies, from return light information being information indicating a time change in intensity of return light from a connected optical path being an optical path connected to a first optical path for an inspection light being transmitted to the first optical path, which of a plurality of optical paths is the connected optical path; and
an output unit that outputs a result of the identification.

Supplementary Note 2

The optical path identification device according to supplementary note 1, wherein
the optical path identification unit performs the identification by a similarity determination between reference information for the return light information being acquired in advance, and the return light information.

Supplementary Note 3

The optical path identification device according to supplementary note 1 or 2, wherein
the optical path identification unit performs the identification by acquisition information being information acquired from the return light information.

Supplementary Note 4

The optical path identification device according to supplementary note 3, wherein
the optical path identification unit performs the identification by performing comparison between reference information for the acquisition information and the acquisition information.

Supplementary Note 5

The optical path identification device according to supplementary note 4, wherein
the acquisition information includes at least one piece of information among a number of relay amplifiers included in the connected optical path, a length of an optical path between two adjacent relay amplifiers included in the connected optical path, a degree of intensity of the return light in each of the plurality of optical paths, and a time since the inspection light is transmitted until the return light from a position having a longest optical cable distance in each of the plurality of optical paths arrives.

Supplementary Note 6

The optical path identification device according to any one of supplementary notes 1 to 5, wherein
the return light is return light from a second optical fiber for the inspection light being transmitted to a first optical fiber.

Supplementary Note 7

The optical path identification device according to supplementary note 6, wherein
the return light is return light that travels through the first optical fiber in a direction opposite to a traveling direction of the inspection light, and is subjected to Rayleigh scattering in each position of the first optical fiber.

Supplementary Note 8

The optical path identification device according to supplementary note 7, further including
a first return light path included in the connected optical path and provided between the first optical fiber and the second optical fiber, wherein
the return light by Rayleigh scattering is incident on the second optical fiber by the first return light path in a direction opposite to a traveling direction of the inspection light.

Supplementary Note 9

The optical path identification device according to supplementary note 8, wherein
the first return light path is included in a relay amplifier included in each of the connected optical path.

Supplementary Note 10

The optical path identification device according to supplementary note 6, further including
a second return light path being an optical path that is included in the connected optical path, is installed in a predetermined position of the first optical path and the connected optical path, and causes a part of the inspection light traveling through the first optical fiber to be incident on the second optical fiber in a direction opposite to a traveling direction of the inspection light, wherein
the return light is derived from light via the second return light path.

Supplementary Note 11

The optical path identification device according to supplementary note 10, wherein
the second return light path is included in a relay amplifier included in the connected optical path.

Supplementary Note 12

The optical path identification device according to any one of supplementary notes 1 to 11, wherein 15 16 the optical path identification device is included in a land station connected to the first optical path.

Supplementary Note 13

The optical path identification device according to any one of supplementary notes 1 to 12, further including
a return light information acquisition unit being a portion that acquires the return light information.

Supplementary Note 14

The optical path identification device according to any one of supplementary notes 1 to 13, further including
the first optical path and the plurality of optical paths.

Supplementary Note 15

An optical path identification method including:
identifying, from return light information being information indicating a time change in intensity of return light from a connected optical path being an optical path connected to a first optical path for an inspection light being transmitted to the first optical path, which of a plurality of optical paths is the connected optical path; and
outputting a result of the identification.

Supplementary Note 16

An optical path identification program causing a computer to execute:
processing of identifying, from return light information being information indicating a time change in intensity of return light from a connected optical path being an optical path connected to a first optical path for an inspection light being transmitted to the first optical path, which of a plurality of optical paths is the connected optical path; and
processing of outputting a result of the identification.
Herein, the "first optical path" in supplementary notes described above is, for example, the first optical path in FIG. 1. Further, the "inspection light" is, for example, the probe light described above. Further, the "connected optical path" is, for example, the second optical path or the third optical path in FIG. 1. Further, the "plurality of optical paths" are, for example, the second optical path and the third optical path in FIG. 1.
Further, the "optical path identification unit" is, for example, the optical path identification unit 16 in FIG. 3 or the optical path identification unit 16x in FIG. 10. Further, the "output unit" is, for example, the output unit 17 in FIG. 3 or the output unit 17x in FIG. 10. Further, the "optical path identification device" is, for example, the optical path identification device 10 and the optical path identification unit 16 in FIG. 3 or the optical path identification device 10x in FIG. 10. Further, the "return light information" is, for example, the return light information described above.
Further, the "first optical fiber" is, for example, the optical fiber D in FIG. 2 or 6. Further, the "second optical fiber" is, for example, the optical fiber U in FIG. 2 or 6. Further, the "first return light path" is, for example, a combination of the optical coupler CD, the optical fiber R, and the optical coupler CU in FIG. 2.
Further, the "relay amplifier" is, for example, the relay amplifier A in FIG. 2 or 6. Further, the "second return light path" is, for example, a combination of the optical coupler CD, the optical fiber R, and the optical coupler CU in FIG. 6.
Further, the "land station" is, for example, the land station C1 in FIG. 1. Further, the "return light information acquisition unit" is, for example, the return light information acquisition unit 11 in FIG. 3. Further, the "computer" is, for example, a computer included in a combination of the storage unit 15, the optical path identification unit 16, and the output unit 17 in FIG. 3. Further, the "optical path identification program" is, for example, a program causing the computer to execute processing, and is held by the storage unit 15, for example.
This application is based upon and claims the benefit of priority from Japanese patent application No. 2021-005430, filed on Jan. 18, 2021, the disclosure of which is incorporated herein in its entirety by reference.

REFERENCE SIGNS LIST 10, 10x Optical path identification device
11 Return light information acquisition unit
12 Transmission unit
13 Reception unit
14 Acquisition processing unit
15 Storage unit
16, 16x Optical path identification unit
17, 17x Output unit
100 Optical submarine cable system
A, A11, A12, A13, A1n, A21, A22, A23, A2m, A31, A32, A33, A3p Relay amplifier
B1 Optical path switching device
C1, C2, C3 Land station
CD, CU Optical coupler
D, D1, D2, D3, U, U1, U2, U3, R, Rm Optical fiber
M Reflector
OAD, OAU Optical amplifier
What is claimed is:
1. An optical path identification device comprising:
an optical path identification circuit configured to identify, from return light information being information indicating a time change in intensity of return light from a connected optical path being an optical path connected to a first optical path for an inspection light being transmitted to the first optical path, which of a plurality of optical paths is the connected optical path; and
an output circuit configured to output a result of the identification,
wherein the return light is return light from a second optical fiber for the inspection light being transmitted to a first optical fiber,
wherein the return light is return light that travels through the first optical fiber in a direction opposite to a traveling direction of the inspection light, and is subjected to Rayleigh scattering in each position of the first optical fiber,
wherein the optical path identification device further comprises a first return light path included in the connected optical path and provided between the first optical fiber and the second optical fiber,
wherein the return light by Rayleigh scattering is incident on the second optical fiber by the first return light path in a direction opposite to a traveling direction of the inspection light, and
wherein the first return light path is included in a relay amplifier included in each of the connected optical path.

2. The optical path identification device according to claim 1, wherein the optical path identification circuit performs the identification by a similarity determination between reference information for the return light information being acquired in advance, and the return light information.

3. The optical path identification device according to claim 1, wherein the optical path identification circuit performs the identification by acquisition information being information acquired from the return light information.

4. The optical path identification device according to claim 3, wherein the optical path identification circuit performs the identification by performing comparison between reference information for the acquisition information, and the acquisition information.

5. The optical path identification device according to claim 4, wherein the acquisition information includes at least one piece of information among a number of relay amplifiers included in the connected optical path, a length of an optical path between two adjacent relay amplifiers included in the connected optical path, a degree of intensity of the return light in each of the plurality of optical paths, and a time since the inspection light is transmitted until the return light from a position having a longest optical cable distance in each of the plurality of optical paths arrives.

6. The optical path identification device according to claim 1, wherein the optical path identification device is included in a land station connected to the first optical path.

7. The optical path identification device according to claim 1, further comprising a return light information acquisition circuit being a portion that acquires the return light information.

8. The optical path identification device according to claim 1, further comprising the first optical path and the plurality of optical paths.

9. An optical path identification device comprising:

an optical path identification circuit configured to identify, from return light information being information indicating a time change in intensity of return light from a connected optical path being an optical path connected to a first optical path for an inspection light being transmitted to the first optical path, which of a plurality of optical paths is the connected optical path; and an output circuit configured to output a result of the identification, wherein the return light is return light from a second optical fiber for the inspection light being transmitted to a first optical fiber, wherein the optical path identification device further comprises a return light path being an optical path that is included in the connected optical path, is installed in a predetermined position of the first optical path and the connected optical path, and causes a part of the inspection light traveling through the first optical fiber to be incident on the second optical fiber in a direction opposite to a traveling direction of the inspection light, wherein the return light is derived from light via the return light path, and wherein the return light path is included in a relay amplifier included in the connected optical path.

10. An optical path identification method comprising:

identifying, from return light information being information indicating a time change in intensity of return light from a connected optical path being an optical path connected to a first optical path for an inspection light being transmitted to the first optical path, which of a plurality of optical paths is the connected optical path; and outputting a result of the identification, wherein the return light is return light from a second optical fiber for the inspection light being transmitted to a first optical fiber, wherein the return light is return light that travels through the first optical fiber in a direction opposite to a traveling direction of the inspection light, and is subjected to Rayleigh scattering in each position of the first optical fiber, wherein a first return light path is included in the connected optical path and is provided between the first optical fiber and the second optical fiber, wherein the return light by Rayleigh scattering is incident on the second optical fiber by the first return light path in a direction opposite to a traveling direction of the inspection light, and wherein the first return light path is included in a relay amplifier included in each of the connected optical path.

* * * * *